(12) United States Patent  (10) Patent No.: US 8,223,455 B2
Iguchi et al.  (45) Date of Patent: Jul. 17, 2012

(54) ROTOR HUB, MOTOR, AND DISK DRIVING DEVICE

(75) Inventors: Takuro Iguchi, Kyoto (JP); Yoshihiro Sameshima, Ibaraki (JP); Takehito Tamaoka, Kyoto (JP); Ryouji Sugiura, Kyoto (JP)

(73) Assignee: Nidec Corporation, Kyoto (JP)

( * ) Notice: Subject to any disclaimer, the term of this patent is extended or adjusted under 35 U.S.C. 154(b) by 1316 days.

(21) Appl. No.: 11/684,130

(22) Filed: Mar. 9, 2007

(65) Prior Publication Data

US 2007/0211375 A1  Sep. 13, 2007

(30) Foreign Application Priority Data

Mar. 10, 2006 (JP) ................... 2006-065638

(51) Int. Cl.
*G11B 17/02* (2006.01)
(52) U.S. Cl. ................... 360/99.08; 360/99.12
(58) Field of Classification Search ............... 360/99.08, 360/99.12
See application file for complete search history.

(56) References Cited

U.S. PATENT DOCUMENTS

| 5,744,881 | A | | 4/1998 | Ishizuka et al. | |
|---|---|---|---|---|---|
| 5,877,918 | A | * | 3/1999 | Katakura et al. | 360/99.08 |
| 6,208,486 | B1 | * | 3/2001 | Gustafson et al. | 360/98.08 |
| 6,556,374 | B1 | * | 4/2003 | Satoh et al. | 360/99.08 |
| 6,794,774 | B2 | * | 9/2004 | Obara et al. | 310/67 R |

FOREIGN PATENT DOCUMENTS

| JP | 3-34153 A | 2/1991 |
|---|---|---|
| JP | 04-288514 A | 10/1992 |
| JP | 6-68153 U | 9/1994 |
| JP | 08-070549 A | 3/1996 |
| JP | 08-214480 A | 8/1996 |
| JP | 10-004665 A | 1/1998 |
| JP | 2566388 Y2 | 3/1998 |
| JP | 2567323 Y2 | 4/1998 |
| JP | 2567324 Y2 | 4/1998 |
| JP | 10-150758 A | 6/1998 |
| JP | 2595791 Y2 | 6/1999 |
| JP | 2963373 B2 | 10/1999 |
| JP | 2000-078814 A | 3/2000 |
| JP | 2002-165395 A | 6/2002 |
| JP | 3742163 B2 | 2/2006 |

* cited by examiner

*Primary Examiner* — Daniell L Negron
*Assistant Examiner* — Carlos E Garcia
(74) *Attorney, Agent, or Firm* — Keating & Bennett, LLP

(57) ABSTRACT

A rotor hub includes a shaft connecting portion arranged to be connected to a shaft serving as a central axis, a disk loading portion centered about the central axis and arranged to support a disk shaped storage medium mounted thereon, a yoke arranged below the disk loading portion and supporting a field magnet at one of an inner side surface thereof and an outer side surface thereof, and a flexible portion connecting the disk loading portion to the yoke and being flexible with respect to a force applied thereto from the yoke.

11 Claims, 13 Drawing Sheets

| TEMPERATURE / ROTOR HUB | 0 ℃ | 60 ℃ |
|---|---|---|
| ROTOR HUB 31 | $2.91 \times 10^{-4}$ | $-4.07 \times 10^{-4}$ |
| ROTOR HUB 31a | $3.31 \times 10^{-4}$ | $-4.63 \times 10^{-4}$ |
| ROTOR HUB 31b | $3.50 \times 10^{-4}$ | $-4.89 \times 10^{-4}$ |
| ROTOR HUB 31c | $2.64 \times 10^{-4}$ | $-3.69 \times 10^{-4}$ |
| ROTOR HUB 31d | $3.07 \times 10^{-4}$ | $-4.29 \times 10^{-4}$ |
| ROTOR HUB 31e | $3.33 \times 10^{-4}$ | $-4.66 \times 10^{-4}$ |
| ROTOR HUB 31f | $1.95 \times 10^{-4}$ | $-2.73 \times 10^{-4}$ |
| ROTOR HUB 91 | $3.86 \times 10^{-4}$ | $-5.40 \times 10^{-4}$ |

Fig. 6

ROTOR HUB, MOTOR, AND DISK DRIVING DEVICE

BACKGROUND OF THE INVENTION

1. Field of the Invention

The present invention relates to a rotor hub to which a disk is attached, a motor having the rotor hub, and a disk driving device having the motor.

2. Description of the Related Art

Conventionally, a disk driving device such as a hard disk drive includes a spindle motor (hereinafter, referred to as a "motor") for driving a storage medium disk attached to a rotor hub. The rotor hub is usually made of a metal material such as aluminum or aluminum alloy. The disk is affixed to the rotor hub via a clamper or the like while the bottom surface of the disk is in contact with the rotor hub.

In the motor such as one described above, a field magnet and a yoke which prevents a loss of a magnetomotive force by covering outer and inner sides of the field magnet are arranged below a disk loading portion. The field magnet generates a torque between an armature and the field magnet. The yoke is made of a ferromagnetic material (e.g., stainless steel) and is affixed to the rotor hub by crimping or press fitting.

In the motor such as one described above, if the yoke is deformed relative to the rotor hub due to a difference in a coefficient of thermal expansion of the yoke and that of the rotor hub, a force generated due to the deformation of the yoke may be conducted to the disk loading portion, thereby deforming the disk loading portion. Also, the disk loading portion may be deformed due to a load applied when affixing the yoke thereto. When the disk loading portion is deformed, the disk may be rotated with a runout which can cause an error in reading and/or in writing of information on the disk.

In order to prevent such deformation, a technique has been conventionally available in which a space is provided between an upper end of a yoke and a hub having a projecting portion so as to maintain the space therebetween, whereby no force will be conducted from the yoke to the hub preventing the deformation of the disk loading portion. Also, a technique has been conventionally available in which a collar portion of a hub is securely sandwiched by a yoke and a driving magnet in order to affix the yoke without applying a large load on the hub.

Further, a technique has been conventionally available in which, in a magnetic disk driving device, a rotor yoke is crimped to a hub, and a portion of a top end of the rotor yoke is in contact with the hub. Also, a technique has been conventionally available in which, in a magnetic disk driving device, a back yoke which protrudes farther outward than a circumference of a hub is affixed to the hub. Also, a technique has been conventionally available in which a layer of adhesive is provided at a portion in which a hub and a yoke are joined to one another to prevent a vibration generated in a magnet while the magnet is in motion from being conducted to the hub.

Despite these conventional techniques, however, although a heat deformation of the disk loading portion can be minimized to a certain extent, it is very difficult to further minimize the deformation of the disk loading portion because a connecting portion between the yoke and the hub is near the disk loading portion and, therefore, a force generated by the yoke is easily conducted to the disk loading portion.

The deformation of the disk loading portion occurring when the yoke is connected to the hub in a conventional disk driving device can be minimized. However, the heat deformation occurring after the connection is made cannot be minimized.

SUMMARY OF THE INVENTION

In view of the problems described above, preferred embodiments of the present invention provide a disk driving device arranged to minimize a deformation of the disk loading portion due to the force generated by the yoke.

According to a preferred embodiment of the present invention, a rotor hub includes a shaft connecting portion arranged to be connected to a shaft serving as a central axis; a disk loading portion centered about the central axis and arranged radially outside of the shaft connecting portion to surround the central axis and to support a disk shaped storage medium mounted thereon; a hollow, approximately cylindrical yoke arranged below the disk loading portion with a center thereof placed on the central axis and supporting a field magnet at one of an inner side surface thereof and an outer side surface thereof; and a flexible portion connecting the disk loading portion to the yoke and being flexible with respect to a force applied thereto from the yoke.

According to another preferred embodiment, the rotor hub includes a disk loading portion having a coefficient of thermal expansion greater than that of the yoke.

According to various preferred embodiments, the deformation of the disk loading portion due to the force from the yoke is minimized.

According to another preferred embodiment, the hub is installed in a motor.

Other features, elements, processes, steps, characteristics and advantaged of the present invention will become more apparent from the following detailed description of the preferred embodiments of the present invention with reference to the attached drawings.

BRIEF DESCRIPTION OF THE DRAWINGS

FIG. 6 is a diagram showing a variation of the degree of the deformation of the disk loading surface when the temperature of the rotor hub changes.

DETAILED DESCRIPTION OF THE PREFERRED EMBODIMENTS

Figure 1:
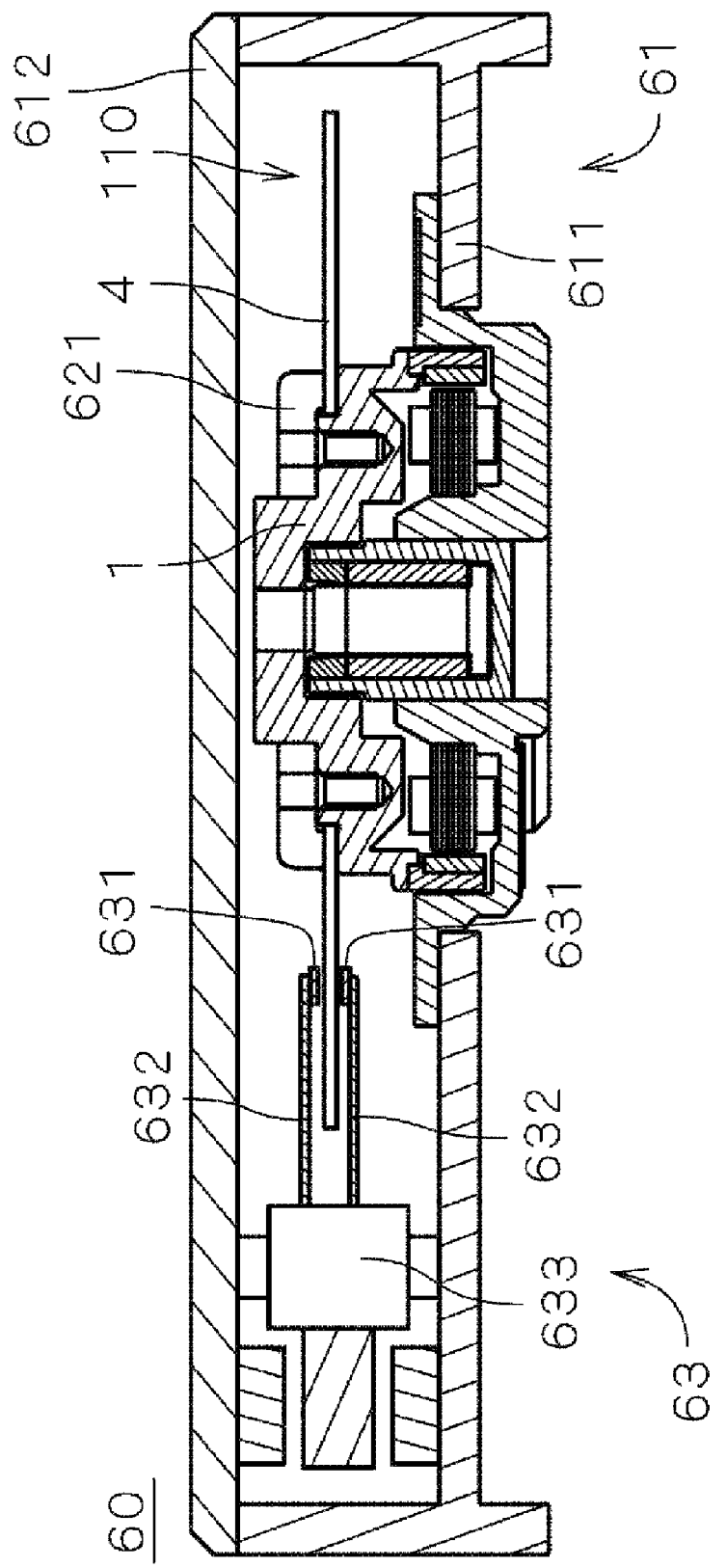
FIG. 1 is a diagram showing an internal configuration of a disk driving device according to a first preferred embodiment of the present invention.

FIG. 1 is a diagram showing an internal configuration of a disk driving device 60 including an electric spindle motor 1 (hereinafter, referred to as "motor 1") according to a first preferred embodiment of the present invention. The disk driving device 60 is a hard disk device which includes a shaft connecting portion connected to a shaft serving as a central axis; a disk 4 having a circular shape, an access portion 63 for reading and/or writing on the disk 4; the electric motor 1 for retaining and rotating the disk 4; and a housing 61 having an internal space 110 for accommodating therein the disk 4, the access portion 63, and the motor 1.

As shown in FIG. 1, the housing 61 includes a first housing member 611 having an opening at a top portion thereof for accommodating therein the motor 1 and the access portion 63, and a plate shaped second housing member 612 defining the internal space 110 by covering the opening of the first housing member 611. In the disk driving device 60, the housing 61 is created by attaching the first housing member 611 and the second housing member 612, thereby defining therein the internal space 110 which is a clean chamber containing an extremely small amount of foreign substances.

The disk 4 is arranged at an upper portion of the motor 1 and is affixed to the motor 1 by a clamper 621. The access portion 63 includes magnetic heads 631 arranged near the disk 4 for reading and writing data, arms 632 for supporting the heads 631, and a head locating member 633 which moves the arms 632 so as to move the heads 631 relative to the disk 4 and the motor 1. By virtue of the configuration described above, the heads 631 may access a specific position of the rotating disk 4 and read and/or write data from/to the disk 4.

Figure 2:
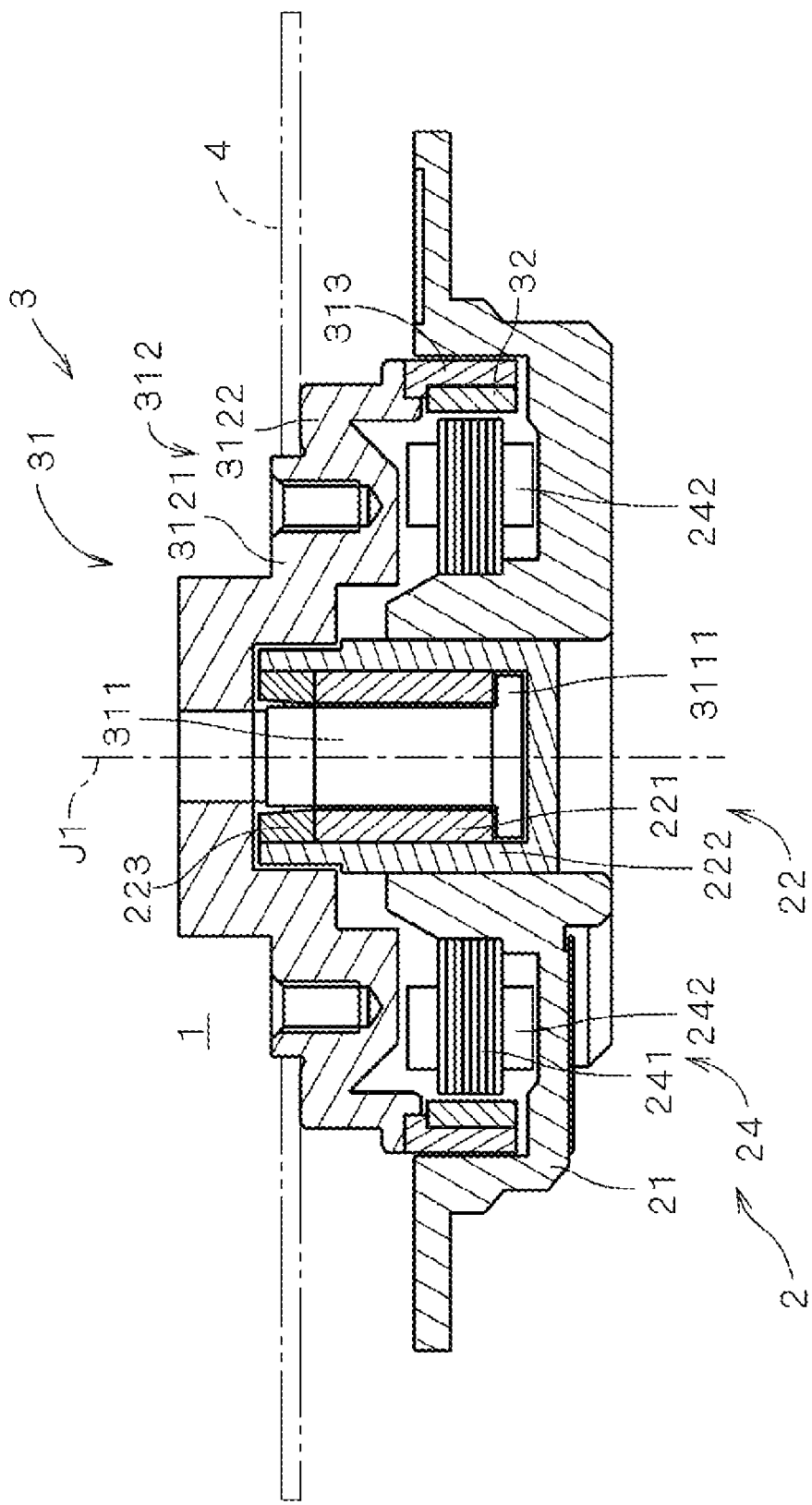
FIG. 2 is a cross sectional view of a motor.

FIG. 2 is a cross sectional view of the motor 1 which is used for rotating the disk 4 in the disk driving device 60. In FIG. 2, the disk 4 which is affixed to the motor 1 is indicated with chain double-dashed lines. As shown in FIG. 2, the motor 1 is an outer rotor type motor including a stator portion 2 and a rotor portion 3. The rotor portion 3 is rotatably supported about a central axis J1 (which is also a rotational axis of a rotor hub 31 which will be described below) by the stator portion 2 via a bearing mechanism utilizing dynamic pressure generated within lubrication oil which is a working fluid. Hereinafter, although a side in an axial direction of the central axis J1 closer to the rotor portion 3 will be referred to as an upper side, and a side closer to the stator portion 2 will be referred to as a lower side, these sides do not necessarily correspond to the gravitational force. Also, words such as left, right, upward, downward, top, and bottom for describing positional relationships between respective members and directions merely indicate positional relationships and directions in the drawings. Such words do not indicate positional relationships and directions of the members mounted in an actual device.

The stator portion 2 includes a base bracket 21 which is a base portion for retaining the components of the stator portion 2, a sleeve unit 22 having a substantially cylindrically shape with a bottom portion which is a portion of the bearing mechanism for rotatably supporting the rotor portion 3, and an armature 24 arranged on the base bracket 21 surrounding the sleeve unit 22.

The sleeve unit 22 includes a sleeve 221 having a cylindrical shape centered about the central axis J1 into which the shaft 311 of the rotor portion 3 is inserted, a sleeve housing 222 having a substantially cylindrical shape with a bottom portion arranged to surround the sleeve 221, and a seal cap 223 arranged above the sleeve 221 and inside the sleeve housing 222. The sleeve 221 is preferably made of a porous material and retains the lubricating oil impregnated in the sleeve housing 222 and the sleeve 221. The armature 24 preferably includes a plurality of silicon steel plates laminated on top of another and a plurality of coils provided in predetermined positions on a core 241.

The rotor portion 3 includes a rotor hub 31 which supports the disk 4 and retains the components of the rotor portion 3, a shaft 311 which has a substantially cylindrical shape centered about the central axis J1 and protrudes in a downward direction from the rotor hub 31, and a field magnet 32 attached to the rotor hub 31 so as to surround the central axis J1. The field magnet 32 is preferably an annular shaped magnet magnetized to multiple poles and arranged to generate together with the armature 24 a rotary torque centered about the central axis J1.

The rotor hub 31 includes a substantially discoid shaped hub 312 attached to the shaft 311 and extending from a top portion of the shaft 311 in a radial direction centered about the central axis J1, and a substantially cylindrically shaped yoke 313 arranged at an outer circumference of the hub 312 and protruding in a downward direction, wherein the field magnet 32 is attached at an inner side of the yoke 313.

The hub 312 includes a substantially discoid shaped protruding portion 3121 which is made of an aluminum material (Al) or an aluminum alloy and protruding in an upward direction and fitting within a central opening of the disk 4, and a substantially annular shaped disk loading portion 3122 supporting the disk 4 at a circumference of the protruding portion 3121. The yoke 313 is made of a ferromagnetic material (e.g., stainless steel) and is arranged below the disk loading portion 3122. The shaft 311 is also preferably made of a material such as stainless steel, and is affixed to the protruding portion 3121 by a method such as press fitting. A substantially discoid shaped thrust plate 3111 is provided at a bottom end of the shaft 311.

In the motor 1, a very small gap is provided between an inner side surface of the seal cap 223 and an outer side surface of the shaft 311, an inner side surface of the sleeve 221 and an outer side surface of the shaft 311, a bottom end surface of the sleeve 221 and a top surface of the thrust plate 3111, and a bottom surface of the thrust plate 3111 and a bottom surface of the sleeve housing 222. The lubricating oil is provided in the gap between the shaft 311 and the sleeve unit 22, thereby defining the bearing mechanism. The inner side surface of the seal cap 223 is inclined with respect to the outer side surface of the shaft 311 so as to form a tapered seal which prevents the lubricating oil from leaking therefrom.

A groove (e.g., a spiral groove) for generating dynamic pressure in the lubricating oil when the rotor portion 3 is in motion is provided at the bottom end surface of the sleeve 221, thereby defining a thrust dynamic pressure bearing portion on the top surface of the thrust plate 3111. Also, a groove (e.g., a herringbone groove provided at the inner side surface of the sleeve 221) for generating the dynamic pressure in the lubricating oil is provided at the opposing surfaces of the shaft 311 and the sleeve 221, thereby defining a radial dynamic pressure bearing portion.

In the motor 1, the rotor portion 3 is supported by the bearing mechanism in a non-contact manner utilizing the dynamic pressure via the lubricating oil, wherein the rotor portion 3 and the disk 4 attached to the rotor portion 3 are allowed to rotate quietly and with precision.

Figure 3:
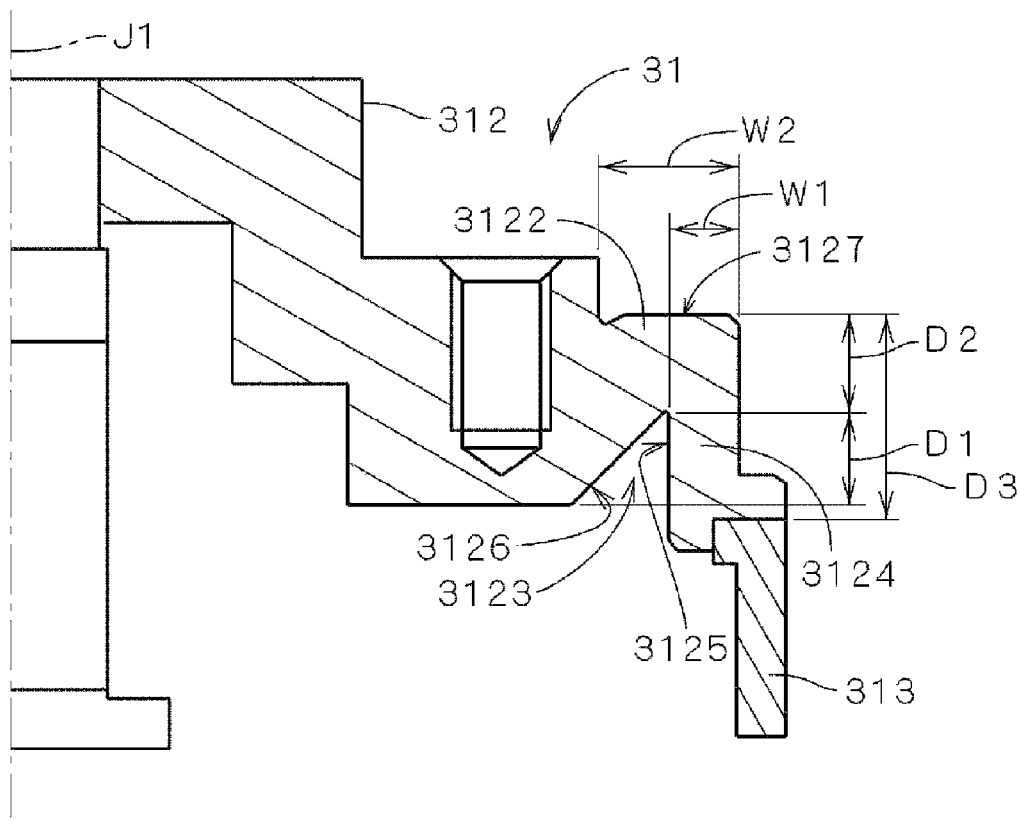
FIG. 3 is an enlarged cross sectional view of a portion of a rotor hub.

FIG. 3 is an enlarged cross sectional view of a portion (a right hand portion of FIG. 2) of the rotor hub 31 of the motor 1. As shown in FIG. 3, in the hub 312, a substantially annular shaped concave portion 3123 is provided centered about the central axis J1 at a lower side of the disk loading portion 3122. At an annular flexible portion 3124 (which will be described below) arranged at an outer side of the concave portion 3123, the disk loading portion 3122 and the yoke 313 are connected to one another. The flexible portion 3124 provided between the disk loading portion 3122 and the yoke 313 has a substantially cylindrical shape, wherein an upper portion thereof is connected to the disk loading portion 3122 and a lower portion thereof is press fitted, for example, to the yoke 313. The lower portion of the flexible portion 3124 may be connected to the yoke 313 by a method other than press fitting.

A width (W1) of the flexible portion 3124 in the radial direction centered about the central axis J1 is smaller than a width (W2) of the disk loading portion 3122 in the radial direction. The flexible portion 3124 is flexible to a force applied thereto in the radial direction from the yoke 313 and from the central axis J1. In the hub 312, W1 of the flexible portion 3124 in the radial direction is about 1.5 mm while W2 of the disk loading portion 3122 in the radial direction is about 3 mm (i.e., W1 is about half of W2). The disk 4 (see FIGS. 1 and 2) loaded on the disk loading portion 3122 may be a 3.5 inch type disk, for example.

As shown in FIG. 3, when seen in a cross sectional view, the concave portion 3123 has a substantially triangular shape, wherein a surface thereof defining an outer side surface 3125 (hereinafter referred to as an "outer side domain"), which is the inner circumferential surface of the flexible portion 3124 with respect to the central axis J1, is parallel to the central axis J1. Further, a surface of the concave portion 3123 defining an inner side domain 3126 (hereinafter, referred to as an "inner side domain") includes an inclined surface such that the nearer a portion thereof is to the disk loading portion 3122, the further the portion is from the central axis J1.

According to the present preferred embodiment, a maximum depth (D1) of the concave portion 3123 in the axial direction is about 2.1 mm while a minimum depth (D2) of the disk loading portion in the axial direction is about 2 mm. Further, a depth (D3) between the top surface of the disk loading portion 3122 and the top surface of the yoke 313 in the axial direction is about 4.37 mm (i.e., D2 is at least about 45% of D3).

In the rotor hub 31, the hub 312 is made of a material (e.g., aluminum or aluminum alloy) having a coefficient of thermal expansion greater than that of the material used to make the yoke 313. Therefore, when a temperature of the rotor hub 31 exceeds about 25 degrees Celsius, which is a designed temperature, the coefficient of thermal expansion of the hub 312 is greater than the coefficient of thermal expansion of the yoke 313 (i.e., the yoke 313 is relatively contracted with respect to the hub 312). By virtue of this configuration, a force (primarily in the radial direction toward the central axis J1) will be applied to the bottom end portion of the hub 312 connected to the yoke 313, and the disk loading portion 3122 will be pulled in the downward direction causing the disk loading portion 3122 to deform. At this point, the outer circumference of the disk loading portion 3122 will be deformed more than the inner circumference of the disk loading portion 3122. Thus, after the temperature of the rotor hub 31 exceeds the designed temperature, an inclination with respect to the central axis J1 of a disk loading surface 3127 which is the top surface of the disk loading portion 3122 will also be deformed in the downward direction. Also, the outer circumference of the disk 4 provided on the disk loading portion 3122 will also be deformed in the downward direction.

Further, when the temperature of the rotor hub 31 falls below the designed temperature, the hub 312 contracts to a greater degree than the yoke 313 (i.e., the yoke 313 expands relative to the hub 312). By virtue of this configuration, a force (primarily in the radial direction away from the central axis J1) will be applied to the bottom end portion of the hub 312, and the outer circumference of the disk loading portion 3122 will be pulled in the upward direction causing the disk loading portion 3122 to deform. At this point, the outer circumference of the disk loading portion 3122 will be deformed in the upward direction more than the inner circumference. Thus, after the temperature of the rotor hub 31 falls below the designed temperature, the inclination with respect to the central axis J1 of the disk loading surface 3127 will also be altered in the upward direction. Also, the outer circumference of the disk 4 provided on the disk loading portion 3122 will be deformed in the upward direction.

Figure 4:
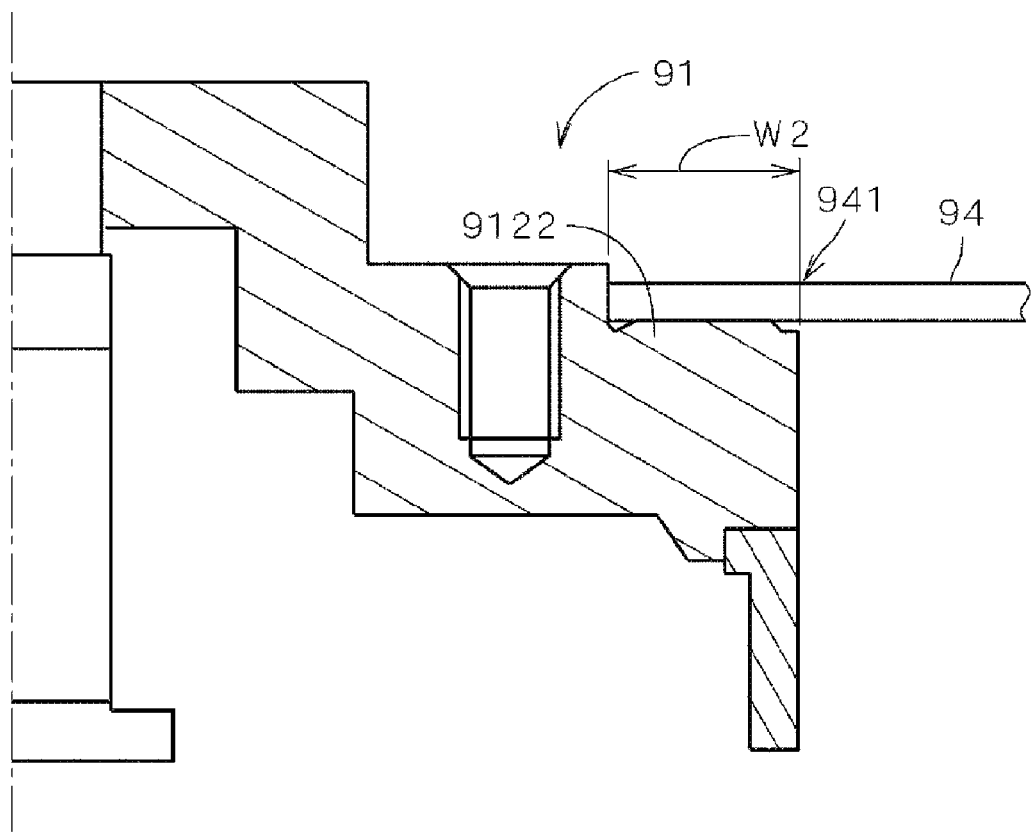
FIG. 4 is an enlarged cross sectional view of a rotor hub which is an exemplary comparison.

FIG. 4 is an enlarged cross sectional view of a rotor hub 91 which is an exemplary comparison of a rotor hub having no flexible portion between a disk loading portion and a yoke. In the rotor hub 91, W2, which is a width of a disk loading portion 9122, is about 4 mm. In the rotor hub 91, in a same manner as in the rotor hub 31, the outer circumference of the disk 94 loaded on the disk loading portion 9122 will be deformed in the downward direction when the temperature of the rotor hub 91 goes above the designed temperature, whereas when the temperature of the rotor hub 91 falls below the designed temperature, the outer circumference of the disk 94 will be deformed in the upward direction.

Figure 5:
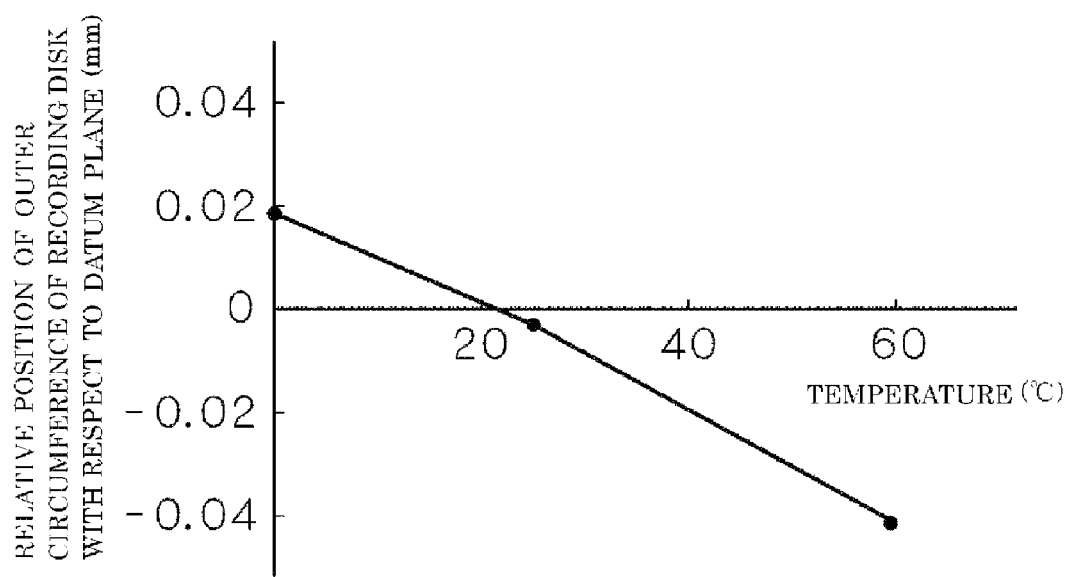
FIG. 5 is a graph indicating a relation between a degree of deformation of a disk provided in a comparative rotor hub and the temperature.

FIG. 5 is a graph indicating a relation between a degree of deformation of the disk 94 which is attached to the rotor hub 91 and the temperature of the rotor hub 91. The horizontal axis in FIG. 5 indicates the temperature of the rotor hub 91, and the vertical axis indicates a relative positioning in the axial direction of the outer circumference of the disk 94 with respect to a datum plane position 941 (i.e., the position of the outer circumference of the disk loading portion 9122). Note that in FIG. 5, the degree of deformation in the upward direction is denoted by positive values. Also note that a distance between the circumferential edge of the disk 94 and the datum plane position 941 is approximately 27.9 mm.

As shown in FIG. 5, when the temperature of the rotor hub 91 is at the designed temperature, the outer circumference of the disk 94 in the axial direction is at the datum plane position 941. Also, when the temperature of the rotor hub 91 is 60 degrees Celsius, the outer circumference of the disk 94 in the axial direction is about 0.04 mm below the datum plane position 941, whereas when the temperature of the rotor hub 91 is 0 degrees Celsius, the outer circumference of the disk 94 in the axial direction is about 0.02 mm above the datum plane position 941.

FIG. 6 is a diagram showing a variation of the inclination of the disk loading surface with respect to the disk loading surface when the temperature of the rotor hub 31 and that of the rotor hub 91 are 25 degrees Celsius. FIG. 6 also indicates the variation of the inclination of the disk loading surface when the temperature of rotor hubs according to other preferred embodiments, which will be described below, changes. In FIG. 6, the variation of the inclination occurring at the disk loading surface when the temperature of the rotor hub changes from the designed temperature to 0 degrees Celsius and to 60 degrees Celsius is calculated by a simulation. Note that when the outer circumference of the disk loading surface rises above the inner circumference thereof in the axial direction, the change is indicated as a positive value. As shown in FIG. 6, the variation of the inclination of the disk loading surface occurring due to the change in the temperature of the rotor hub is smaller in the rotor hub 31 according to the current preferred embodiment than in the comparative rotor hub 91.

In the rotor hub 31, as shown in FIG. 3, the flexible portion 3124 is provided between the disk loading portion 3122 and the yoke 313. The flexible portion 3124 flexibly absorbs heat deformation of the yoke 313 relative to the hub 312 so as to minimize the conduction of the deformation to the disk loading portion 3122. By virtue of such a unique configuration, as shown in FIG. 6, the deformation of the disk loading portion 3122 occurring due to the force generated by the yoke 313 is minimized.

Consequently, the disk 4 will be maintained in a perpendicular manner with respect to the central axis J1, whereby the disk driving device 60 is allowed to read and write information from and to the disk 4 regardless of the temperature of the motor 1. The configuration of the rotor hub 31 described above is particularly suited for a rotor hub having the hub 312 and the yoke 313 made of materials having a coefficient of thermal expansion different from one another.

Further, in the rotor hub 31, when the yoke 313 is press fitted into the hub 312, the flexible portion 3124 flexibly adjusts to a pressure generated by the press fitting so as to minimize the pressure from being conducted to the disk loading portion 3122, thereby minimizing the deformation of the disk loading portion 3122.

Further, in the rotor hub 31, since W1 of the flexible portion 3124 in the radial direction is smaller than W2 of the disk loading portion 3122 in the radial direction, conduction of the force generated by the yoke 313 to the disk loading portion 3122 is minimized. Consequently, the deformation of the disk loading portion 3122 due to the pressure generated by the yoke 313 will be further minimized.

Further, since the concave portion 3123 is arranged below the disk loading portion 3122, the flexible portion 3124 is easily provided. Furthermore, since the inner side domain 3126 of the concave portion 3123 includes the inclined surface as described above, a sufficient thickness of a portion of the hub 312 below the disk loading portion 3122 and an inward portion of the hub 312 is maintained thereby appropriately maintaining a stiffness of the hub 312.

In the rotor hub 31, since D2 (about 2 mm) of the disk loading portion 3122 is greater than about 45% of D3 (about 4.37 mm) between the top surface of the disk loading portion 3122 and the top surface of the yoke 313 in the axial direction, the stiffness of the disk loading portion 3122 is maintained while the deformation of the disk loading portion 3122 due to the force generated by the yoke 313 is minimized.

Figure 7:
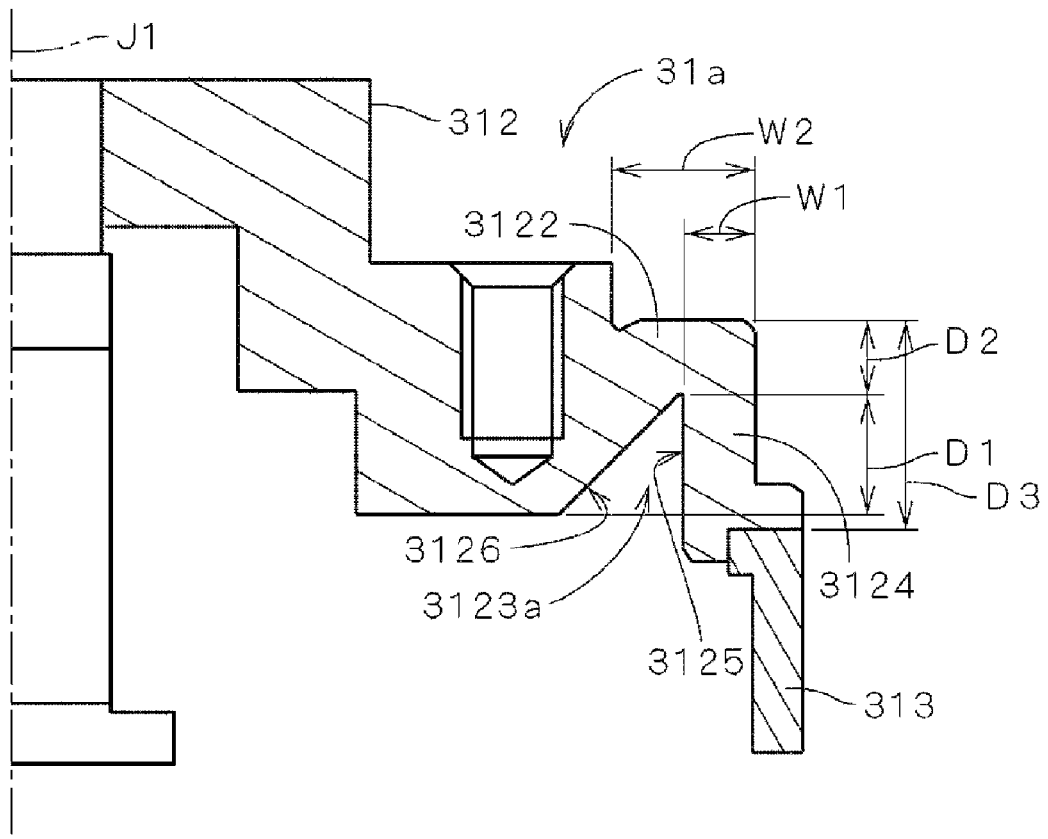
FIG. 7 is an enlarged cross sectional view of a portion of a rotor hub according to a second preferred embodiment of the present invention.

Next, a rotor hub 31a according to a second preferred embodiment of the present invention will be described. FIG. 7 is a cross sectional view of a portion of the rotor hub 31a. Note that the configuration shown in FIG. 7 is identical to the configuration shown in FIG. 3 except that in the rotor hub 31a shown in FIG. 7, a concave portion 3123a is formed differently from the concave portion 3123 of the rotor hub 31 shown in FIG. 3. Also note that elements shown in FIG. 7 similar to those illustrated in FIG. 3 are denoted by similar reference numerals, and description thereof is omitted.

As shown in FIG. 7, in the rotor hub 31a of the hub 312, a substantially annular shaped concave portion 3123a is centered about the central axis J1 below the disk loading portion 3122. As in the first preferred embodiment, the outer side domain 3125 is parallel to the central axis J1 and the inner side domain 3126 includes the inclined surface such that the nearer a portion thereof is to the disk loading portion 3122, the further the portion is from the central axis J1.

In the rotor hub 31a, a maximum depth (D1) of the concave portion 3123a in the axial direction is about 2.6 mm while a minimum depth (D2) of the disk loading portion in the axial direction is about 1.5 mm, for example. Further, a distance (D3) between the top surface of the disk loading portion 3122 and the top surface of the yoke 313 in the axial direction is about 4.37 mm (i.e., D2 is at least about 30% of D3), for example. Note that in the rotor hub 31a, the radial width of the flexible portion 3124 and the radial width of the disk loading portion 3122, respectively W1 and W2, are preferably identical to those in the first preferred embodiment.

In the rotor hub 31a, the flexible portion 3124 flexibly absorbs the heat deformation of the yoke 313 so as to minimize the conduction of the force generated by the yoke 313 to the disk loading portion 3122. By virtue of such configuration, as shown in FIG. 6, compared with the comparative rotor hub 91 (see FIG. 4) having no flexible portion, the deformation of the disk loading portion 3122 due to the force generated by the yoke 313 is more effectively minimized.

In comparison between the rotor hubs of the first and the second preferred embodiments, although an axial length of the flexible portion 3124 is greater in the rotor hub 31a, the disk loading portion 3122 of the rotor hub 31a is more likely to be deformed as shown in FIG. 6. Such a phenomenon occurs due to the fact that D2 of the disk loading portion 3122 is greater in the rotor hub 31 than in the rotor hub 31a which means that the stiffness of the disk loading portion 3122 in the rotor hub 31a is decreased. As described above, D2 of the disk loading portion 3122 in the rotor hub 31 is equal to or greater than about 45% of D3 between the top surface of the disk loading portion 3122 and the top surface of the yoke 313, whereas D2 of the disk loading portion 3122 in the rotor hub 31a is equal to or greater than about 30% of D3.

Therefore, in view of above described differences between the first and the second preferred embodiments, D2 of the disk loading portion 3122 is preferably equal to or greater than about 30% (more preferably about 45%) of D3 between the top surface of the disk loading portion 3122 and the top surface of the yoke 313. Also, in order to minimize the conduction of the force of the yoke 313 to the disk loading portion 3122 while appropriately maintaining the axial length of the flexible portion 3124, D2 is preferably equal to or greater than about 70% of D3.

Figure 8:
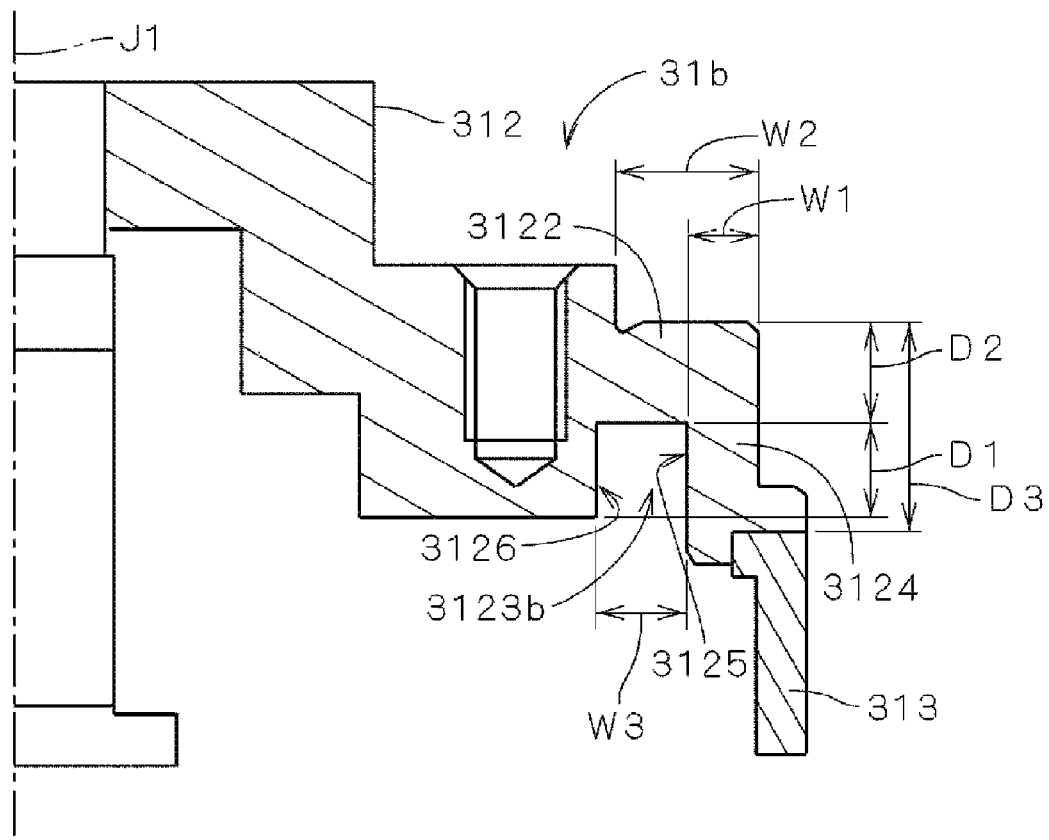
FIG. 8 is an enlarged cross sectional view of a portion of a rotor hub according to a third preferred embodiment of the present invention.

Next, a rotor hub 31b according to a third preferred embodiment of the present invention will be described. FIG. 8 is a cross sectional view of a portion of the rotor hub 31b. Note that the configuration shown in FIG. 8 is identical to the configuration shown in FIG. 3 except that in the rotor hub 31b shown in FIG. 8 a concave portion 3123b is formed differently from the concave portion 3123 of the hub 31 shown in FIG. 3. Also note that the elements shown in FIG. 8 similar to those illustrated in FIG. 3 are denoted by similar reference numerals, and description thereof is omitted.

As shown in FIG. 8, in the rotor hub 31b of the hub 312, a substantially annular shaped concave portion 3123b is provided centered about the central axis J1 below the disk loading portion 3122. As seen in FIG. 8, the concave portion 3123b has an approximately rectangular shape, wherein the inner side domain 3126 and the outer side domain 3125 are parallel to the central axis J1.

In the rotor hub 31b, D1 of the concave portion 3123b in the axial direction is about 2.1 mm and a maximum radial direction width (W3) of the concave portion 3123b is about 1.9 mm, for example. Also, D2 in the axial direction of the disk loading portion 3122 is, as in the first preferred embodiment, about 2 mm, while D3 between the top surface of the disk loading portion 3122 and the top surface of the yoke 313 is about 4.37 mm, for example. W1 of the flexible portion 3124 is about 1.5 mm while W2 of the disk loading portion 3122 is about 3 mm, for example.

In the rotor hub 31b, as in the first preferred embodiment, the flexible portion 3124 flexibly absorbs the heat deformation of the yoke 313 so as to minimize the conduction of the force generated by the yoke 313 to the disk loading portion 3122. By virtue of such configuration, as shown in FIG. 6, compared with the comparative rotor hub 91 (see FIG. 4) having no flexible portion, the deformation of the disk loading portion 3122 occurring due to the force generated by the yoke 313 is more effectively minimized.

In the rotor hub 31b, W3 of the concave portion 3123b is equal to or shorter than about half of a total of D1 of the concave portion 3123b and D2 of the disk loading portion 3122, thereby maintaining an appropriate thickness of the portion of the hub 312 inward of the disk loading portion 3122 so as to maintain the stiffness of the hub 312 in an appropriate manner.

Figure 9:
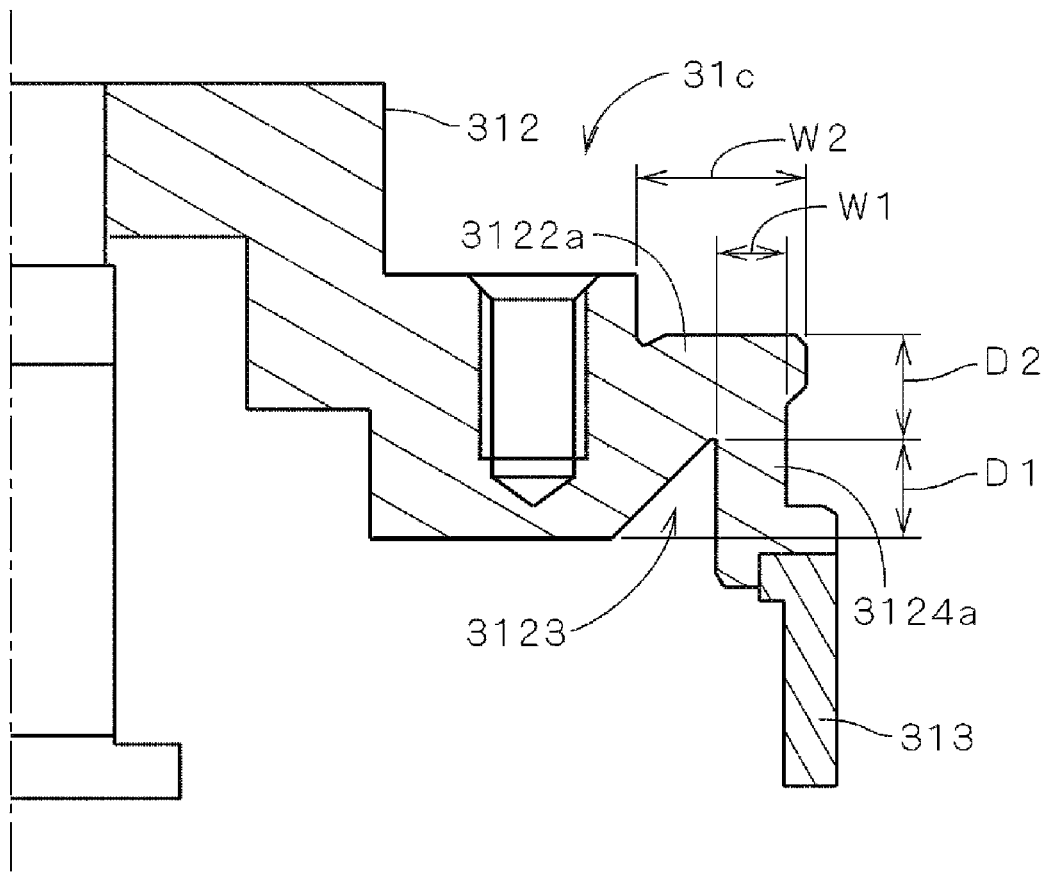
FIG. 9 is an enlarged cross sectional view of a portion of a rotor hub according to a fourth preferred embodiment of the present invention.

Next, a rotor hub 31c according to a fourth preferred embodiment of the present invention will be described. FIG. 9 is a cross sectional view of a portion of the rotor hub 31c. Note that the configuration shown in FIG. 9 is preferably identical to the configuration shown in FIG. 3 except that a width of the disk loading portion 3122 and a width of the flexible portion 3124 of the rotor hub 31 shown in FIG. 3 are different from a width of the disk loading portion 3122a and a width of the flexible portion 3124a of the hub 312. Also note that elements shown in FIG. 9 similar to those illustrated in FIG. 3 are denoted by similar reference numerals, and description thereof is omitted.

In the rotor hub 31c, the radial directional width of the flexible portion 3124a is about 1.4 mm and the radial directional width of the disk loading portion 3122a is about 3.4 mm (i.e., W1 is approximately 40% of W2), for example. D1 of the concave portion 3123 is about 2.1 mm and D2 of the disk loading portion 3122a is about 2 mm, for example, which is preferably identical to those in the first preferred embodiment.

In the rotor hub 31c, in the same manner as in the first preferred embodiment, the flexible portion 3124a flexibly absorbs the heat deformation of the yoke 313 so as to minimize the conduction of the heat deformation to the disk loading portion 3122a. By virtue of such configuration, as shown in FIG. 6, compared with the comparative rotor hub 91 (see FIG. 4) having no flexible portion, the deformation of the disk loading portion 3122a occurring due to the force generated by the yoke 313 is more effectively minimized.

When comparing the rotor hubs from the first preferred embodiment to the fourth preferred embodiment, the rotor hub 31c has the largest value for W2 of the disk loading portion, while the rotor hub 31c has the smallest ratio of the flexible portion with respect to W2 of the disk loading portion. As shown in FIG. 6, the rotor hub 31c has the smallest degree of deformation to the disk loading portion. Therefore, it can be said that a wide width of a disk loading portion increases the stiffness of the disk loading portion while a flexible portion having a small value of W1 with respect to W2 further effectively suppresses the conduction of the force generated by the yoke 313 to the disk loading portion.

Therefore, in order to further minimize the conduction of the force generated by the yoke 313 to the disk loading portion, thereby minimizing the deformation of the disk loading portion, W1 of the flexible portion is preferably equal to or shorter than half of W2 of the disk loading portion. Further, in order to securely retain the yoke 313, W1 is preferably equal to or greater than about 25% of W2.

Figure 10:
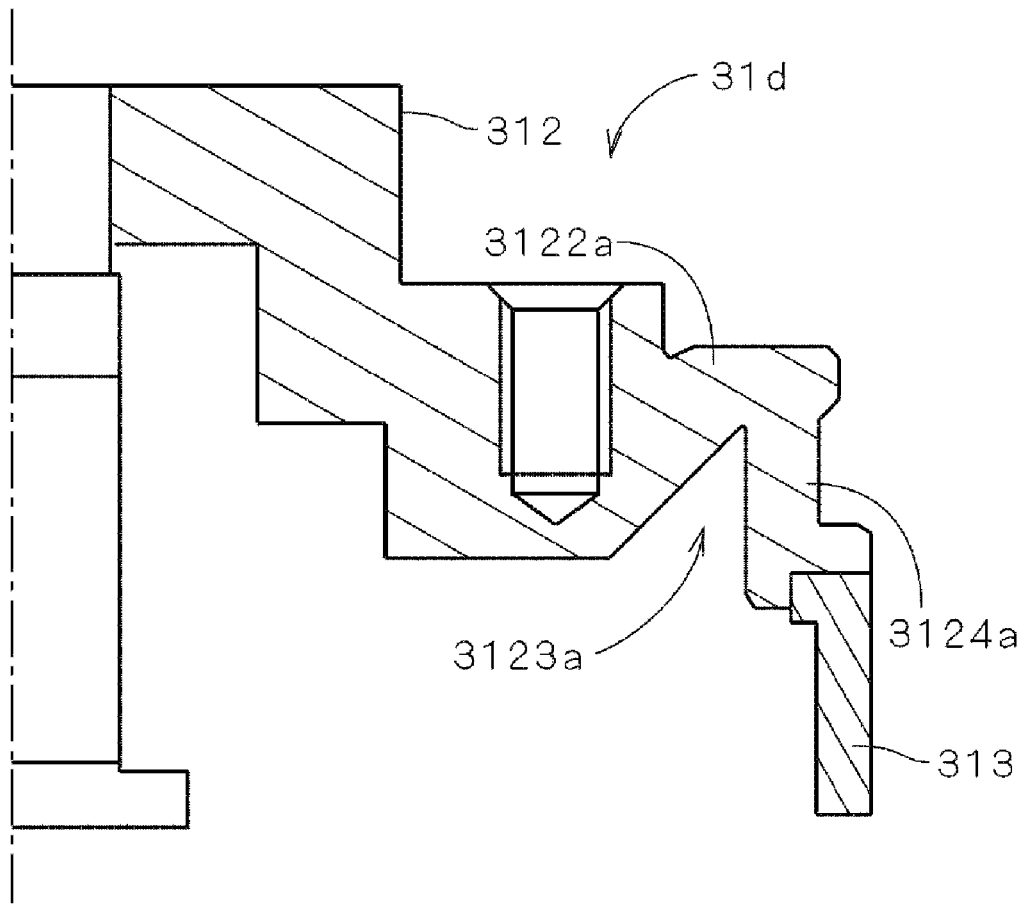
FIG. 10 is an enlarged cross sectional view of a portion of a rotor hub according to a fifth preferred embodiment of the present invention.
Figure 11:
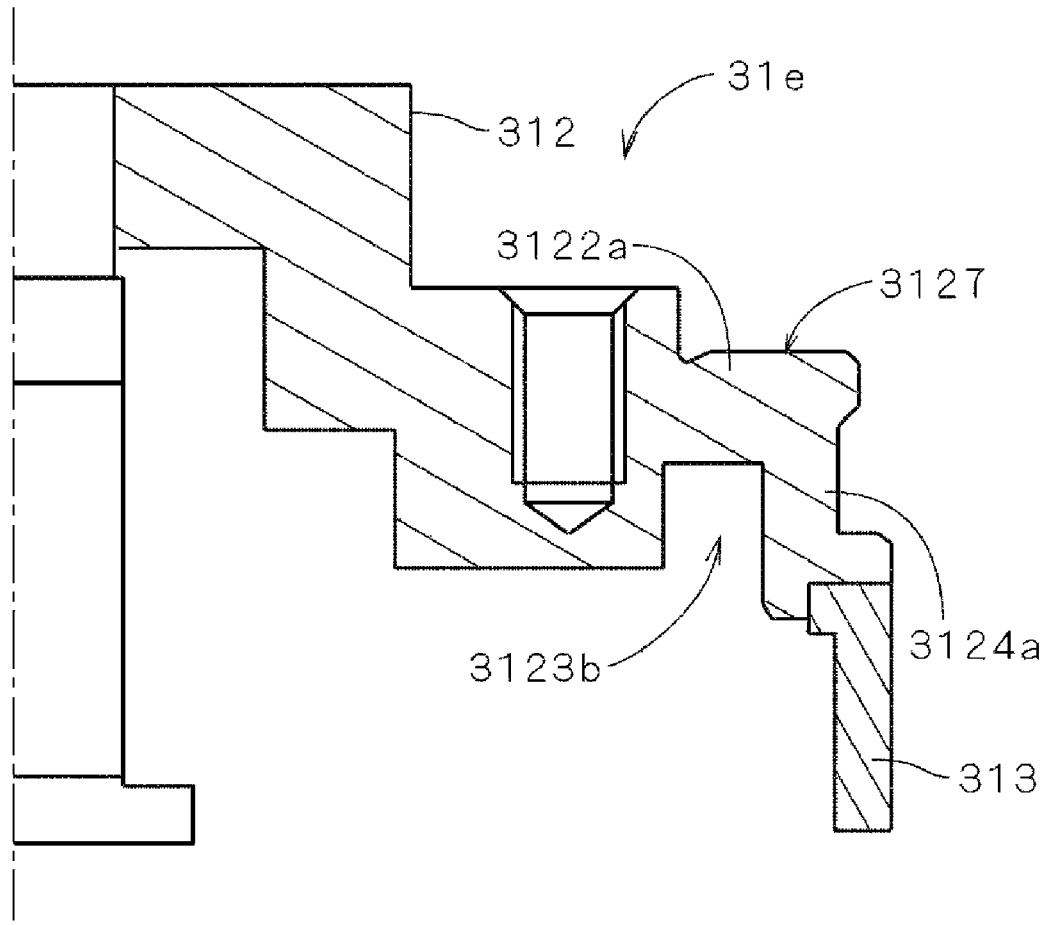
FIG. 11 is an enlarged cross sectional view of a portion of a rotor hub according to a sixth preferred embodiment of the present invention.

Next, a rotor hub 31d and a rotor hub 31e according to, respectively, a fifth preferred embodiment and a sixth preferred embodiment of the present invention will be described. FIGS. 10 and 11 are each cross sectional views of a portion of the rotor hub 31d and a portion of the rotor hub 31e. Note that the configurations shown in FIGS. 10 and 11 are identical to the configuration shown in FIG. 9 except that the rotor hub 31d shown in FIG. 10 includes the concave portion 3123a similar to that in the rotor hub 31a shown in FIG. 7 instead of the concave portion 3123 of the rotor hub 31c shown in FIG. 9, and the root hub 31e includes, as shown in FIG. 11, the concave portion 3123b similar to that in the rotor hub 31b shown in FIG. 8 instead of the concave portion 3123 of the rotor hub 31c shown in FIG. 9. Also note that elements shown in FIGS. 10 and 11 similar to those illustrated in FIG. 9 are denoted by similar reference numerals, and description thereof is omitted.

In the rotor hub 31d and the rotor hub 31e, the flexible portion 3124a flexibly absorbs, in the same manner as in the first preferred embodiment, the heat deformation of the yoke 313 so as to minimize the conduction of the force generated by the yoke 313 to the disk loading portion 3122a. By virtue of such configuration, as shown in FIG. 6, compared with the comparative rotor hub 91 (see FIG. 4) having no flexible portion, the deformation of the disk loading portion 3122a occurring due to the force generated by the yoke 313 is more effectively minimized.

Figure 12:
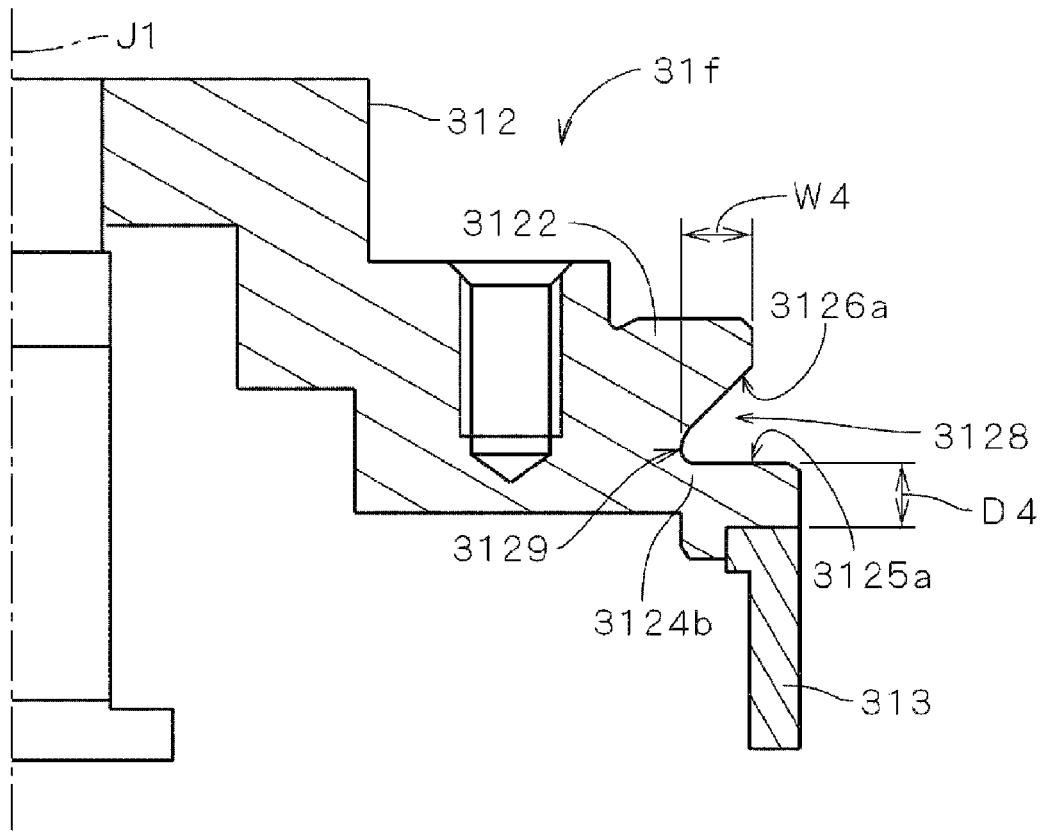
FIG. 12 is an enlarged cross sectional view of a portion of a rotor hub according to a seventh preferred embodiment of the present invention.

Next, a rotor hub 31f according to a seventh preferred embodiment of the present invention will be described. FIG. 12 is a cross sectional view of a portion of the rotor hub 31f. Note that the configuration shown in FIG. 12 is preferably identical to the configuration shown in FIG. 3 except that the rotor hub 31f shown in FIG. 12 includes a concave portion (hereinafter, referred to as a "lateral concave portion") 3128 arranged and centered about the central axis J1 at an outer side surface of the hub 312 (i.e., not arranged below the hub 312) so as to form a flexible portion 3124b (in other words, the lateral concave portion 3128 is arranged on the outer side surface of the flexible portion 3124b).

As shown in FIG. 12, when seen from the cross sectional view, the lateral concave portion 3128 has a substantially triangular shape, wherein a lower side domain 3125a is perpendicular to the central axis J1 and an upper side domain 3126a includes an inclined surface such that the nearer a portion thereof is to the disk loading portion 3122, the further the portion is from the central axis J1. Also, in the rotor hub 31f, a bottom portion 3129 of the lateral concave portion 3128 nearest to the central axis J1 is arranged further inward in the radial direction (i.e., toward the central axis J1) than the outer side surface of the disk loading portion 3122. Also, according to the present preferred embodiment, the bottom portion 3129 is arranged further inward in the radial direction than a center portion in the radial direction of the disk loading portion 3122. Also, according to the present preferred embodiment, a radial width (W4) between the outer side surface of the disk loading portion 3122 and the bottom portion 3129 of the lateral concave portion 3128 is about 1.5 mm, for example. Also, an axial depth (D4) between a bottom of the lateral concave portion 3128 and the top surface of the yoke 313 is about 1.37 mm, for example.

In the rotor hub 31f, as in the first preferred embodiment, the flexible portion 3124b minimizes the conduction of the force generated by the yoke 313 to the disk loading portion 3122. By virtue of such configuration, as shown in FIG. 6, compared with the comparative rotor hub 91 (see FIG. 4) having no flexible portion, the deformation of the disk loading portion 3122 occurring due to the force generated by the yoke 313 is more effectively minimized. Also, since the bottom portion 3129 of the lateral concave portion 3128 is arranged further inward in the radial direction of the outer side surface of the disk loading portion 3122, the flexible portion 3124b is more flexible thereby effectively minimizing the conduction of the heat deformation of the yoke 313 to the disk loading portion 3122.

Figure 13:
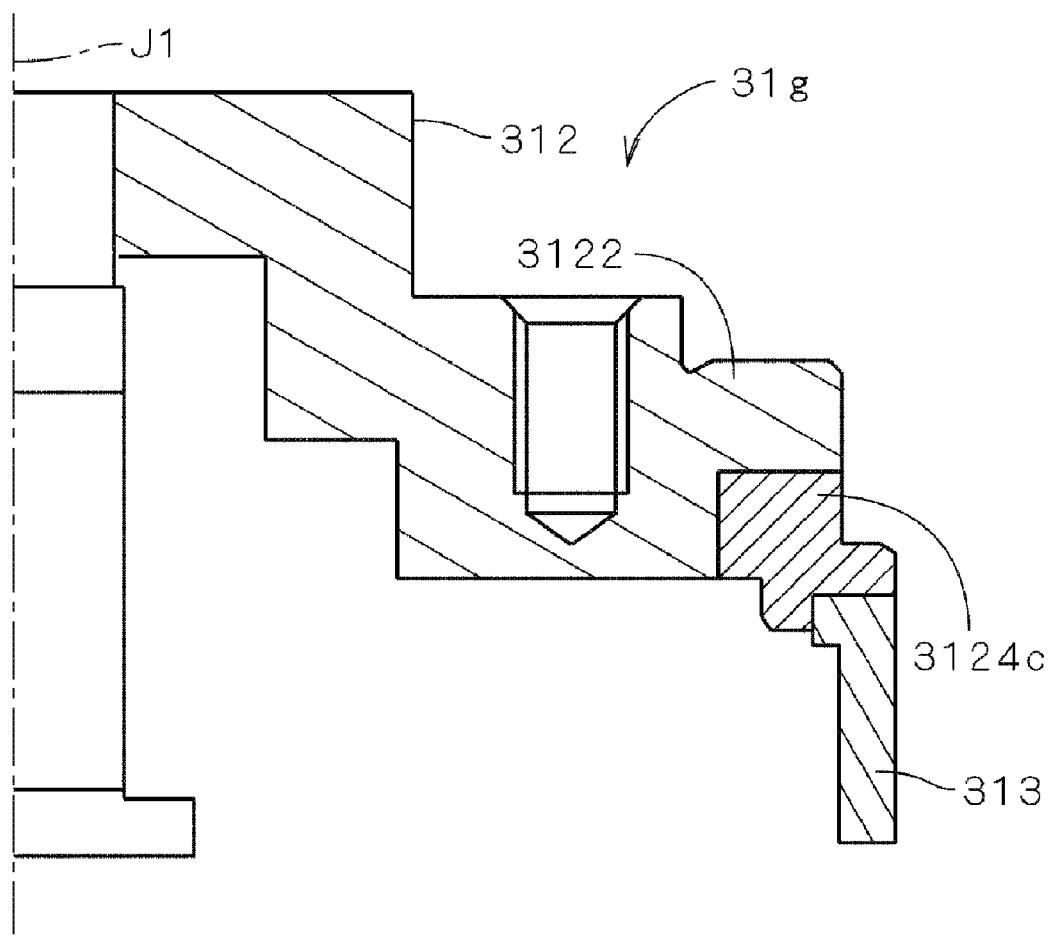
FIG. 13 is an enlarged cross sectional view of a portion of a rotor hub according to an eighth preferred embodiment of the present invention.

Next, a rotor hub 31g according to an eighth preferred embodiment of the present invention will be described. FIG. 13 is a cross sectional view of a portion of the rotor hub 31g. In the rotor hub 31g, a flexible portion 3124c is made of a material having a smaller Young's modulus than a material used to make the disk loading portion 3122. According to the present preferred embodiment, the flexible portion 3124c is preferably made of a resin or plastic material, while all elements in the hub 312 except for the flexible portion 3124c are made of a metal material (e.g., aluminum or aluminum alloy).

In the rotor hub 31g, as in the first preferred embodiment, the flexible portion 3124c minimizes the conduction of the force generated by the yoke 313 to the disk loading portion 3122. By virtue of such configuration, compared with the comparative rotor hub 91 (see FIG. 4) having no flexible portion, the deformation of the disk loading portion 3122 occurring due to the force generated by the yoke 313 is more effectively minimized.

While the preferred embodiments of the present invention have been described in detail, the foregoing description is in all aspects illustrative and not restrictive. It is understood that numerous other modifications and variations can be devised without departing from the scope of the invention.

For example, although the connection method between the yoke 313 and the hub 312 is described as preferably being press fitted, the present invention is not limited thereto. For example, the yoke 313 and the hub 312 may be connected by a method including any one of or a combination of crimping, adhesion, welding, or the like.

According to the motor of the above described preferred embodiments, the field magnet 32 is preferably arranged outward of the armature 24 (i.e., the above described motor is preferably an outer rotor type motor). However, the motor may be an inner rotor type motor in which the field magnet 32 is arranged inward of the armature 24. When the motor has the inner rotor type configuration, the field magnet 32 is arranged at an outer side surface of the yoke 313.

The motor according to the above described preferred embodiments preferably may have a configuration in which the shaft 311 is affixed to the base bracket 21, and the sleeve unit 22 affixed to the hub 312 of the rotor hub rotates with respect to the shaft 311. The bearing mechanism of such a motor may be, for example, a gas dynamic pressure bearing utilizing gas as a working medium thereof. Also, the bearing may be a ball bearing.

The disk driving device 60 including the above described motor preferably may be used as a device to drive a storage medium such as a magnetic disk, an optical disk, an optical magnetic disk or the like.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:
1. A rotor hub for use in a motor of a disk drive, comprising:
a shaft connecting portion arranged to be directly connected to a shaft serving as a central axis such that the rotor hub rotates together with the shaft;
a disk loading portion centered about the central axis, arranged radially outside the shaft connecting portion so as to surround the central axis;
a hollow, approximately cylindrical yoke arranged below the disk loading portion, centered about the central axis, and supporting a field magnet at one of an inner side surface thereof and an outer side surface thereof; and
a flexible portion connecting the disk loading portion to the yoke and arranged to absorb a force applied thereto from the yoke; wherein
an upper portion of the yoke is positioned below the flexible portion;
the yoke protrudes in a downward direction such that a radial outer surface of the yoke does not contact any portion of the flexible portion;
the disk loading portion includes an upper surface arranged to receive a disk-shaped storage medium thereon and a lower surface including a concave portion, the concave portion opening toward the lower surface and having an approximately annular shape centered about the central axis;
an axially uppermost portion of the flexible portion is arranged at the same axial height as an axially uppermost portion of the concave portion; and
a radially outer surface of the concave portion is a radially inner surface of the flexible portion.

2. The rotor hub according to claim 1, wherein the disk loading portion has a coefficient of thermal expansion greater than a coefficient of thermal expansion of the yoke.

3. The rotor hub according to claim 1, wherein
the flexible portion has a hollow, approximately cylindrical shape centered about the central axis; and
a radial width of the flexible portion is smaller than a radial width of the disk loading portion.

4. The rotor hub according to claim 3, wherein the radial width of the flexible portion is equal to or shorter than about half of the radial width of the disk loading portion.

5. The rotor hub according to claim 3, wherein a minimum depth of the disk loading portion in the axial direction is equal to or greater than about 30% of a depth between an upper surface of the disk loading portion and an upper end of the yoke in the axial direction.

6. The rotor hub according to claim 1, wherein the concave portion is defined by the radially outer surface which is substantially parallel to the central axis and an inclined surface connected at an upper end thereof to the radially outer surface, the inclined surface being inclined to the central axis such that the upper end thereof is farther from the central axis than a lower end thereof.

7. The rotor hub according to claim 6, wherein a maximum radial width of the concave portion is equal to or shorter than about half of a total of a depth of the concave portion in an axial direction along the central axis plus a depth of the disk loading portion in the axial direction.

8. A motor for use in a disk drive for rotating a disk-shaped storage medium, comprising:
a rotor including the rotor hub according to claim 1 arranged such that a central axis of the rotor hub is coincident with a rotation axis of the motor, and the field magnet affixed to the yoke of the rotor hub and arranged around the rotation axis;

a stator including an armature generating together with the field magnet a torque centered about the rotation axis, and a base portion to which the armature is attached; and a bearing supporting the rotor in a rotatable manner around the rotation axis relative to the stator.

9. A disk drive comprising:

a disk-shaped storage medium capable of storing information;

the motor according to claim 8 for rotating the disk-shaped storage medium;

a head arranged to at least one of read information from and write information to the disk-shaped storage medium; and a head moving arrangement arranged to move the head relative to the disk-shaped storage medium and the motor.

10. The rotor hub according to claim 1, wherein the yoke is made of a magnetic material.

11. The rotor hub according to claim 1, wherein the rotor hub further includes a notched portion defined in an outer radial surface of the rotor hub, the notched portion being provided on a surface of the rotor hub between the disk loading portion and the upper portion of the yoke.

\* \* \* \* \*